Patented July 14, 1936

2,047,675

UNITED STATES PATENT OFFICE 2,047,675

ANHYDRIDE OF THE HALF ESTER OF CARBONIC AND SALICYLIC ACIDS AND PROCESS OF MAKING THE SAME

Lucien Alexandre Dupont, Vincennes, France

No Drawing. Application July 2, 1934, Serial No. 733,516. In France July 11, 1933

9 Claims. (Cl. 260—123)

The present invention consists in the anhydrides of the half ester of carbonic and salicylic acids and a process for the manufacture of the same. The products are suitable for industrial applications and further, capable, by condensation and by substitution, of producing new products equally suitable for industrial applications.

These products are obtained according to the invention by causing carbonyl chloride to react with a dimetal salicylate suspended in a neutral solvent, the reaction being effected at a low temperature.

In the Ach and Sutter Patent 922,995 (1909) a process for the production of salicylosalicylic acid is described, according to which process phosgene (carbonyl chloride) is caused to act on one part of di-potassium salicylate suspended in four parts of benzene, under application of heat, whereby potassium salicylosalicylate is obtained, from which the said salicylosalicylic acid is produced.

Boehringer in Example 8 of his German patent specification No. 211,403 (U. S. A. Patent 922,995) says that, by causing phosgene (carbonyl chloride) to act on one part of dipotassium salicylate suspended in four parts of benzene, with the application of heat, potassium salicylosalicylate is obtained, from which salicylosalicylic acid is produced, the production of this acid being the object of the invention described in the aforementioned patent specification.

The present invention, starting also with phosgene (carbonyl chloride) and with a dimetal salicylate in suspension in a neutral solvent, discloses that when working at a low temperature the reaction proceeds in accordance with the following equation:

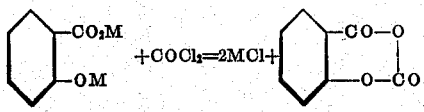

a cyclic body, mixed anhydride of the half ester of carbonic and salicylic acids (or carbonyl salicylate), being produced. This body is soluble in hot benzene and only slightly soluble in cold benzene. It crystallizes easily into fine needles. Under the influence of heat it decomposes before melting, with the evolution of $CO_2$. In the above equation, M indicates a metal, in accordance with the usual terminology.

Under the same conditions the homologues of salicylates give homologous derivatives of the anhydride of the half ester of carbonic and salicylic acids.

It is desirable that the reaction be carried out at a temperature such that the reaction will not proceed toward the dissociation of the product formed, by causing the loss of carbon dioxide, and that the reaction should not be changed to form simple salicylic condensation products which do not contain any carbonic radical. If heating is allowed to occur during the reaction to a temperature such that dissociation occurs, the desired product is not formed.

In order to enable the process of the invention to be better understood, an example of the same is given below.

100 grammes of carbonyl chloride are caused to react at a low temperature and with vigorous stirring on 200 grammes of anhydrous and finely powdered disodium salicylate, in the presence of 1,000 grammes of toluene. The sodium chloride formed and the salicylate which has not taken part in the reaction are washed and filtered off.

The toluenic liquors are evaporated at a low temperature.

The substance obtained is purified by crystallization.

What I claim is:

1. A process for obtaining a mixed anhydride of the half ester of carbonic and salicylic acids, consisting in causing carbonyl chloride to act upon a di-alkali-metal salicylate at a low temperature.

2. A process for obtaining a mixed anhydride of the half ester of carbonic and salicylic acids, consisting in causing carbonyl chloride to act upon a di-alkali-metal salicylate at a low temperature, said salicylate being suspended in a neutral solvent.

3. A process for obtaining a mixed anhydride of the half ester of carbonic and salicylic acids, consisting of causing 100 parts by weight of carbonyl chloride to react with 200 parts by weight of anhydrous and finely powdered disodium salicylate under vigorous stirring at a low temperature and in the presence of 1,000 parts by weight of toluene, washing and filtering off the sodium chloride formed and the salicylate which has not entered into the reaction, evaporating the toluenic liquors at a low temperature, and finally purifying the substance obtained by crystallization.

4. A process for obtaining a mixed anhydride of the half ester of carbonic and salicylic acids, consisting in causing carbonyl chloride to react at a low temperature with a homologue of a di-alkali metal salicylate.

5. A process for obtaining a mixed anhydride of the half ester of carbonic and salicylic acids, consisting in causing carbonyl chloride to act upon disodium salicylate at a low temperature.

6. A process for obtaining a mixed anhydride of the half ester of carbonic and salicylic acids, consisting in causing carbonyl chloride to act upon disodium salicylate at a low temperature, said disodium salicylate being suspended in a neutral solvent.

7. A process for obtaining a mixed anhydride of the half ester of carbonic and salicylic acids, consisting in causing carbonyl chloride to react at a low temperature with a homologue of disodium salicylate.

8. The mixed anhydride of the half ester of carbonic and salicylic acids.

9. A compound of the benzene hexagon type having the formula

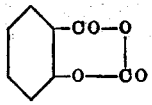

LUCIEN ALEXANDRE DUPONT.